United States Patent
Côté

(10) Patent No.: US 7,197,181 B1
(45) Date of Patent: Mar. 27, 2007

(54) QUICK METHOD FOR COLOR-BASED SELECTION OF OBJECTS IN A RASTER IMAGE

(75) Inventor: Stéphane Côté, Lac Beauport (CA)

(73) Assignee: Bentley Systems, Inc., Exton, PA (US)

( * ) Notice: Subject to any disclaimer, the term of this patent is extended or adjusted under 35 U.S.C. 154(b) by 710 days.

(21) Appl. No.: 10/409,114

(22) Filed: Apr. 9, 2003

(51) Int. Cl.
*G06K 9/00* (2006.01)

(52) U.S. Cl. ............... 382/164; 382/282; 382/173

(58) Field of Classification Search ........... 382/164, 382/282, 173, 266; 358/1.9, 1.13; 359/464; 348/51; 345/611, 582, 589
See application file for complete search history.

(56) References Cited

U.S. PATENT DOCUMENTS

| | | | | |
|---|---|---|---|---|
| 5,782,762 | A * | 7/1998 | Vining | 600/407 |
| 6,167,167 | A * | 12/2000 | Matsugu et al. | 382/283 |
| 6,404,936 | B1 * | 6/2002 | Katayama et al. | 382/283 |
| 6,453,069 | B1 * | 9/2002 | Matsugu et al. | 382/173 |
| 6,757,444 | B2 * | 6/2004 | Matsugu et al. | 382/283 |
| 6,766,055 | B2 * | 7/2004 | Matsugu et al. | 382/173 |

OTHER PUBLICATIONS

Tan et al., "Selecting Objects with Freehand Sketches", IEEE, vol. 1, Jul. 2001, pp. 337-344.*

* cited by examiner

*Primary Examiner*—Anh Hong Do
(74) *Attorney, Agent, or Firm*—Venable LLP; Caroline J. Swindell

(57) ABSTRACT

A quick method of selecting an object in a raster image, comprises the steps of: selecting a seed region in a raster image with an input device, wherein the raster image comprises at least one object and a plurality of pixels, each pixel having a color, and wherein the seed region comprises at least one pixel in the object; moving a cursor corresponding to the input device to a distance d from the seed region in the raster image; generating a selected region from the seed region, wherein the selected region comprises at least all pixels in the seed region, the selected region is enclosed by a contour, and wherein the size of the selected region is based on the distance d and on a comparison of a color of a pixel outside the selected region and a range of color of pixels in the selected region; and choosing the selected region when the selected region is satisfactory to a user.

40 Claims, 17 Drawing Sheets

QUICK METHOD FOR COLOR-BASED SELECTION OF OBJECTS IN A RASTER IMAGE

BACKGROUND OF THE INVENTION

1. Field of the Invention

The present invention relates generally to raster image manipulation, and more particularly to selecting specific raster image objects for manipulation.

2. Related Art

The manipulation and editing of a raster image generally involves several image processing operations that can be applied either to the entire image or to portions of it. For instance, FIG. 1A shows a raster image, and FIG. 1B shows the same raster image where the contrast of the entire image has been enhanced to make it more clear. In another example, FIG. 2A shows a raster image, and FIG. 2B shows the same image with only portions of the image (i.e. the van, part of the pedestrian crosswalk and the left turn arrow) enhanced to emphasize those portions of the image.

One difficulty in working with portions of raster images is that it is usually difficult to select an object precisely. There are several approaches to selecting an object. FIG. 3A shows an original raster image. FIG. 3B shows the raster image of FIG. 3A where a region corresponding to a rough approximation of the van object, in this case a rectangle, has been highlighted. FIG. 3C shows the more desirable method of contour selection of the van object, where only the area within the contour of the vehicle is highlighted.

There are conventional commercially available tools to assist in the selection of an individual object in a raster image, and these tools typically fall into three categories. In a first category, manual selection tools allow the user to select the object by drawing the outline of the shape to be selected. This method requires a steady hand on the part of the user, and occasionally requires more precision than can be obtained from common drawing hardware such as a mouse or drawing tablet. A second category includes semi-automatic tools that involve the user in guiding the computer's finding of the contour of the desired object. A third category includes automatic tools that can select an object automatically, for example by selecting all local areas similar in color to a user-selected point on the desired object. In this case, the user must usually select a color tolerance value to allow for variations in the color on the object.

Automatic tools are the easiest and fastest tools for the user, however, a great deal of trial and error is needed when the user sets the color tolerance value. Examples of automatic tools include the Magic Wand tool in Corel Photo-Paint®, available from Corel Corporation of Ottawa, Ontario, Canada, and the Magic Wand tool in Adobe PhotoShop®, available from Adobe Systems Inc. of San Jose, Calif.

These "magic wand" tools have several specific disadvantages. First, the size of the selected region is highly dependent on the value of the color tolerance chosen by the user. For instance, if the color tolerance value is too high, the resulting selected area will be too large (i.e. larger than the object to be selected), and the user has to reset the value and try again with a lower value. The selected area depends both on the color tolerance value and the seed location. Because the color value of a pixel is frequently different from the color value of its neighbors, the exact location of the seed area has a non-negligible effect on the size and shape of the resulting selected area. Therefore, because it is very difficult for a user to select the same seed area twice, due to pixel to pixel color variation, it often quite hard for a user to select the exact area he wants.

A second disadvantage is that the color tolerance value provided by the user is used as a range around the initial seed area or pixel selected. A pixel outside the selected region is added to that region if its color falls within the range of the seed color +/− the color tolerance value. Consequently, for such a technique to work well (i.e. to minimize the problems caused by the use of a +/− color tolerance), the user needs to select a seed pixel that falls in the center of the color interval of the pixels that compose the object to be selected. If the color of the seed selected by the user is not exactly in the center of that color interval, then the selected area might include undesired regions and, at the same time, exclude other regions that should have been selected. For instance, in a case where selection is based on color intensity only, if the color tolerance value is 10, and the user selects a seed area of intensity 25, then the selected area includes pixels with intensity ranging from 15 to 35. If the object to be selected had pixel intensities ranging from 20 to 40, then this selection is wrong, even though the intensity of the chosen seed falls within that interval. For such methods based on a color seed and a +/− color tolerance value to work well, the object to be selected must be surrounded by areas that are very different (in color) from the object to be selected.

Third, images often show shadows or variations in color intensity. Since automatic tools are often based on color intensity, they are very sensitive to such variations, and might exclude regions that have similar colors but that are different only because of variations of lighting conditions.

What is needed then is an improved method of selecting raster image objects that overcomes shortcomings of conventional solutions.

SUMMARY OF THE INVENTION

In an exemplary embodiment of the present invention a system, method and computer program product for a quick method for color-based selection of objects in a raster image is disclosed.

In an exemplary embodiment, the present invention can be a method of selecting an object in a raster image comprising the steps of: selecting a seed region in a raster image with an input device, wherein the raster image comprises at least one object and a plurality of pixels, each pixel having a color, and wherein the seed region comprises at least one pixel in the object; moving a cursor corresponding to the input device to a distance d from the seed region in the raster image; generating a selected region from the seed region, wherein the selected region comprises at least all pixels in the seed region, the selected region is enclosed by a contour, and wherein the size of the selected region is based on the distance d and on a comparison of a color of a pixel outside the selected region and a range of color of pixels in the selected region; and choosing the selected region when the selected region is satisfactory to a user.

In another exemplary embodiment, the present invention can be a system for selecting an object in a raster image comprising: means for selecting a seed region in a raster image with an input device, wherein the raster image comprises at least one object and a plurality of pixels, each pixel having a color, and wherein the seed region comprises at least one pixel in the object; means for determining a distance d from an input device cursor to the seed region; means for generating a selected region from the seed region, wherein the selected region comprises at least all pixels in the seed region, the selected region is enclosed by a contour, and wherein the size of the selected region is based on the distance d and on a comparison of a color of a pixel outside the selected region and a range of color of pixels in the selected region; and means for choosing the selected region when the selected region is satisfactory to a user.

In another exemplary embodiment, the present invention can be a computer useable information storage medium storing computer readable program code for causing a computer to perform the steps of: receiving a selection of a seed region in a raster image, wherein the raster image comprises at least one object and a plurality of pixels, each pixel having a color, and wherein the seed region comprises at least one pixel in the object; determining a distance d from an input device cursor to the seed region; generating a selected region from the seed region, wherein the selected region comprises at least all pixels in the seed region, the selected region is enclosed by a contour, and wherein the size of the selected region is based on the distance d and on a comparison of a color of a pixel outside the selected region and a range of color of pixels in the selected region; and choosing the selected region when the selected region is satisfactory to a user.

Further features and advantages of the invention, as well as the structure and operation of various embodiments of the invention, are described in detail below with reference to the accompanying drawings.

BRIEF DESCRIPTION OF THE DRAWINGS

The foregoing and other features and advantages of the invention will be apparent from the following, more particular description of a preferred embodiment of the invention, as illustrated in the accompanying drawings wherein like reference numbers generally indicate identical, functionally similar, and/or structurally similar elements. The left most digits in the corresponding reference number indicate the drawing in which an element first appears.

FIGS. 1A–B depict an exemplary embodiment of a raster image-before and after a contrast adjustment;

DEFINITIONS

As used herein, the following terms shall have the following meanings.

Color space: A method for representing colors, where each color is represented by a set of three parameters. A color space is generally seen as a three-dimensional space, where the coordinates are the parameters of the color space.

RGB: A color space based on three parameters: red (R), green (G) and blue (B). It is the color space generally used on color computer monitors.

CIELAB: A color space that is perceptually uniform for human vision. This means that a small variation of a parameter is perceived approximately equally by the human eye, across the range of that parameter. It also means that Euclidean distance between two points in the CIELAB color space is proportional to the difference between the two corresponding colors perceived by the human eye. The CIELAB color space has three parameters: intensity l, color a and color b.

DETAILED DESCRIPTION OF AN EXEMPLARY EMBODIMENT OF THE PRESENT INVENTION

A preferred embodiment of the invention is discussed in detail below. While specific exemplary embodiments are discussed, it should be understood that this is done for illustration purposes only. A person skilled in the relevant art will recognize that other components and configurations can be used without parting from the spirit and scope of the invention.

In an exemplary embodiment, the present invention provides a new interactive user interface that allows the user to select easily an object based on its color without having to manually adjust a tolerance value. The object selection system adapts to the colors of the object being selected and compares them using equations that simulate behavior of the human eye, improving the quality of the selection.

Embodiments of the present invention have several advantages over the existing technology described above. First, it simplifies the use of the "magic wand" tool by letting the user automatically change the value of the color tolerance simply by moving the mouse or other input device. This makes the tool much easier and faster to use. The color selection is not based on a simple +/− color tolerance value, but instead on an adaptive color selection system for which the user does not need to select the pixel having the color that falls in the center of a color interval to get a good selection. The present invention can use the Commission Internationale de l'Eclairage (CIE) CIELAB color space system, which is based on CIE's research into human vision and is device independent. Therefore, the selected colors are more uniform from a human vision point of view, and consequently more likely to represent objects as users see them. The seed, which determines the initial color to be selected, can be a single pixel, but can also be a region including several pixels. This makes the selection much more stable, making it less sensitive to the location of the seed.

Figure 1A:
Figure 2A:
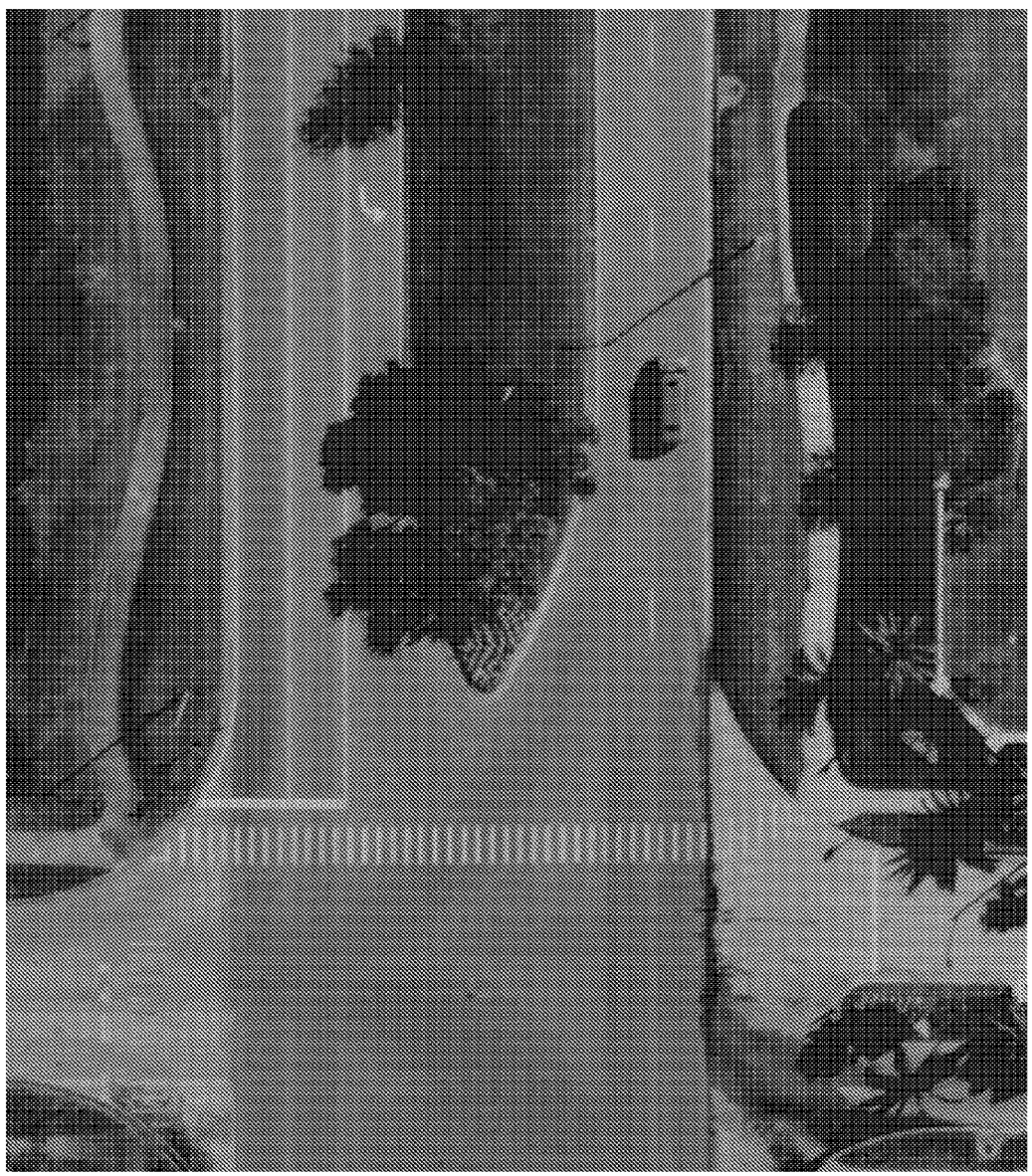
FIG. 2A depicts an exemplary embodiment of a raster image.
Figure 2B:
FIG. 2B depicts an exemplary embodiment of the raster image of FIG. 2A after adjusting the contrast of several objects within the image.
Figure 3B:
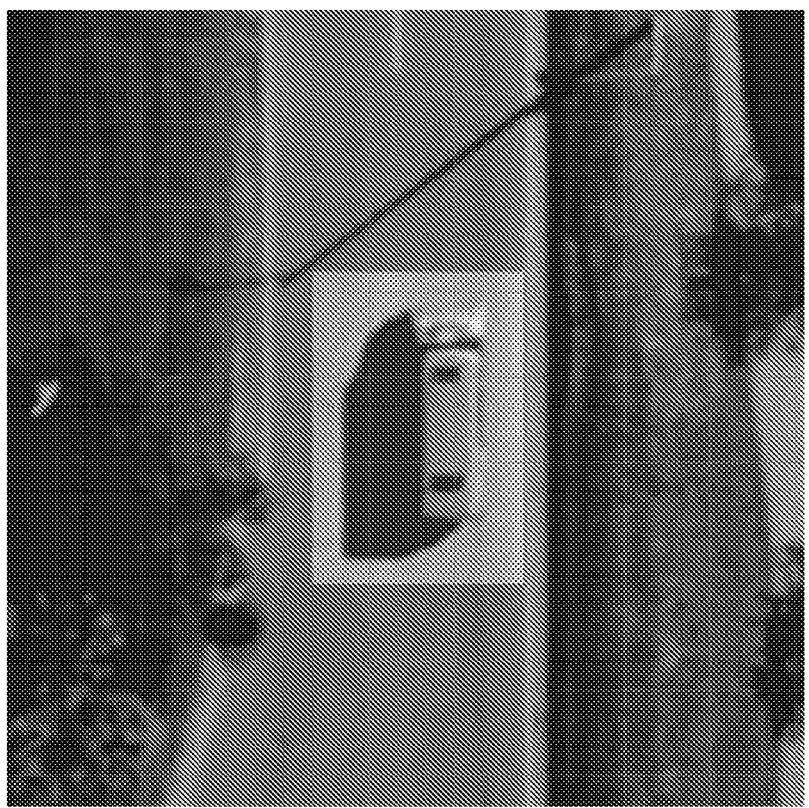
FIG. 3B depicts an exemplary embodiment of the raster image of FIG. 3A after adjusting the contrast of an area corresponding to a rough approximation of an object.
Figure 3A:
FIG. 3A depicts an exemplary embodiment of a raster image.
Figure 3C:
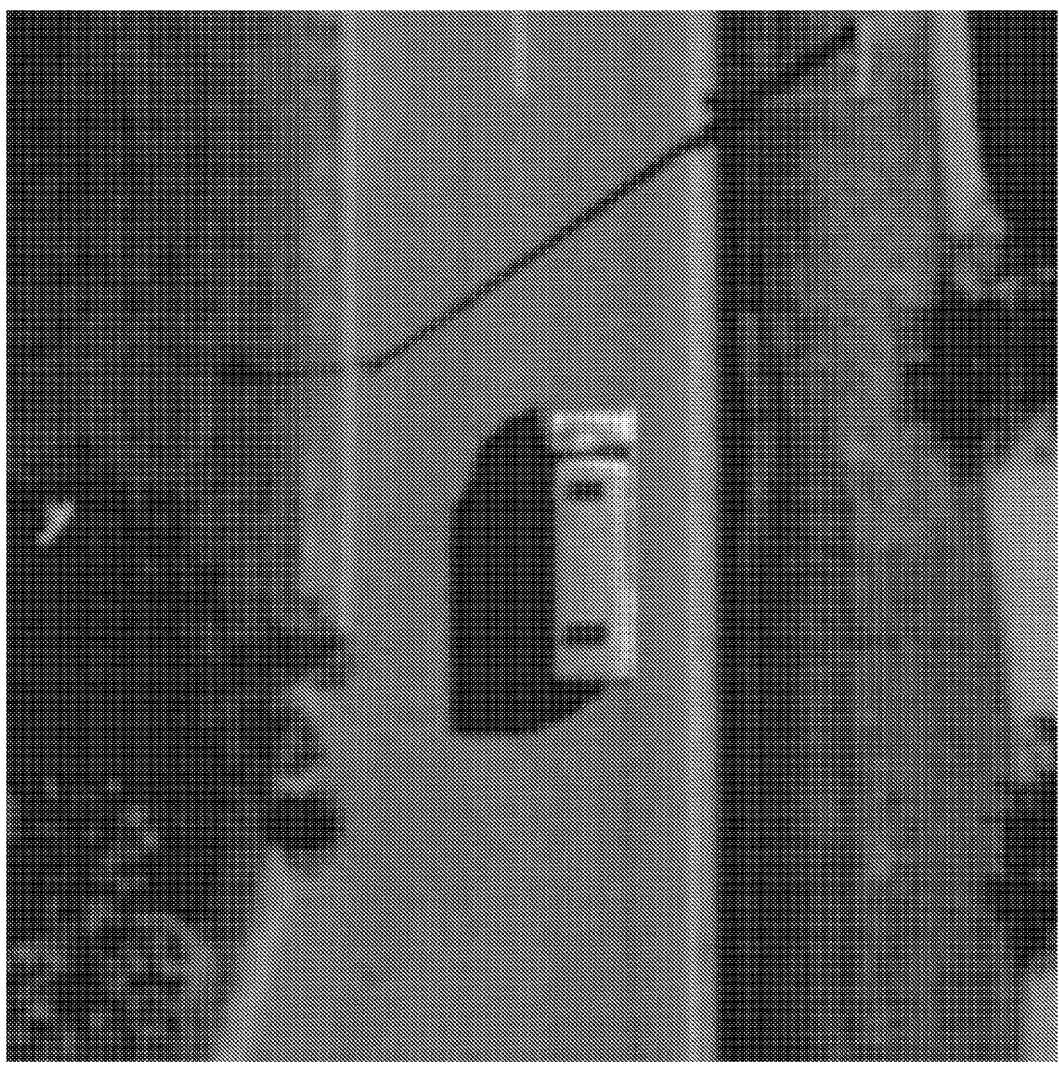
FIG. 3C depicts an exemplary embodiment of the raster image of FIG. 3A after adjusting the contrast of an area corresponding to a detailed contour of an object.
Figure 4:
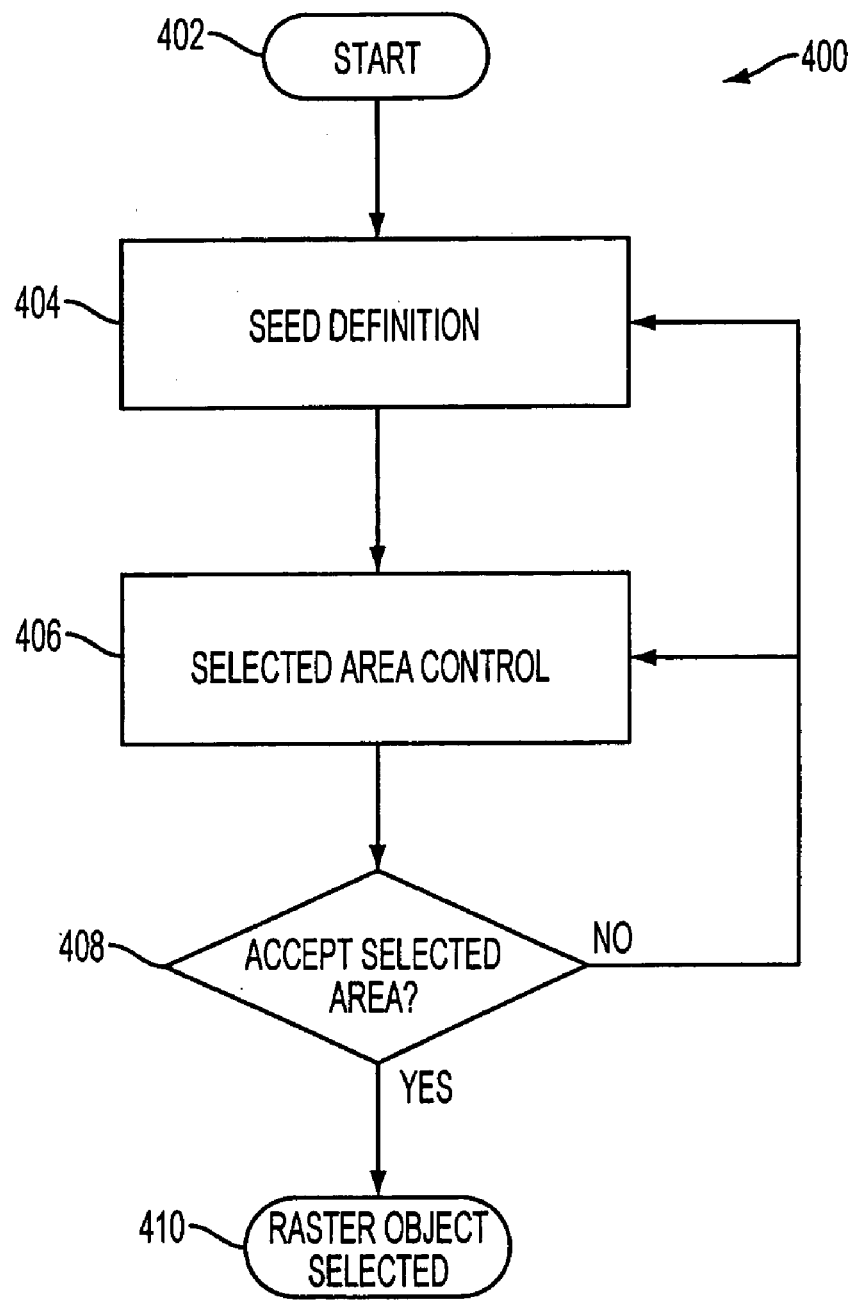
FIG. 4 depicts a flowchart of an exemplary embodiment of the method of the present invention.

In an exemplary embodiment, the method of the present invention takes place in three main stages as shown in FIG. 4. Starting with an object in the raster image at 402, the seed area is defined in step 404. Next, the user controls the area to be selected in step 406. If the resulting selected area is acceptable at step 408, the raster object is then selected and available for further manipulation by the user at step 410. Otherwise, the process can start over from either step 404 or 406.

Figure 5B:
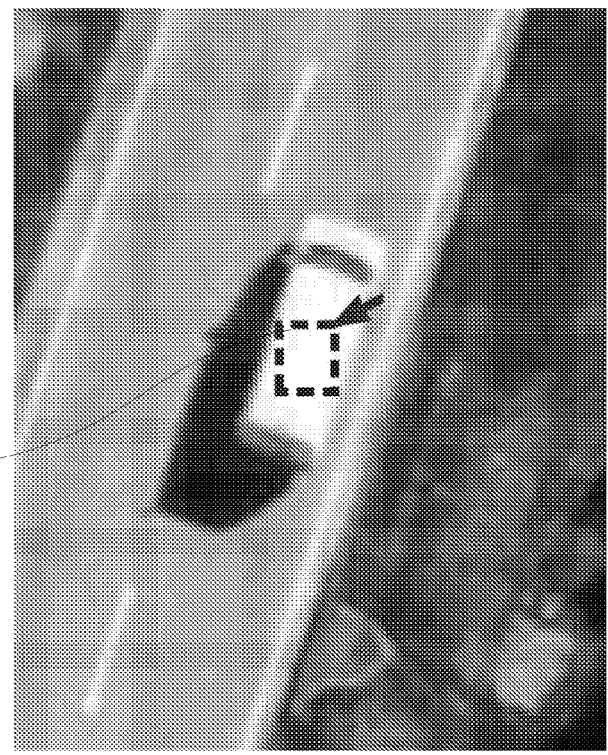
FIGS. 5A–C depict an exemplary embodiment of selecting a seed region according to the present invention.
Figure 5A:
Figure 5C:
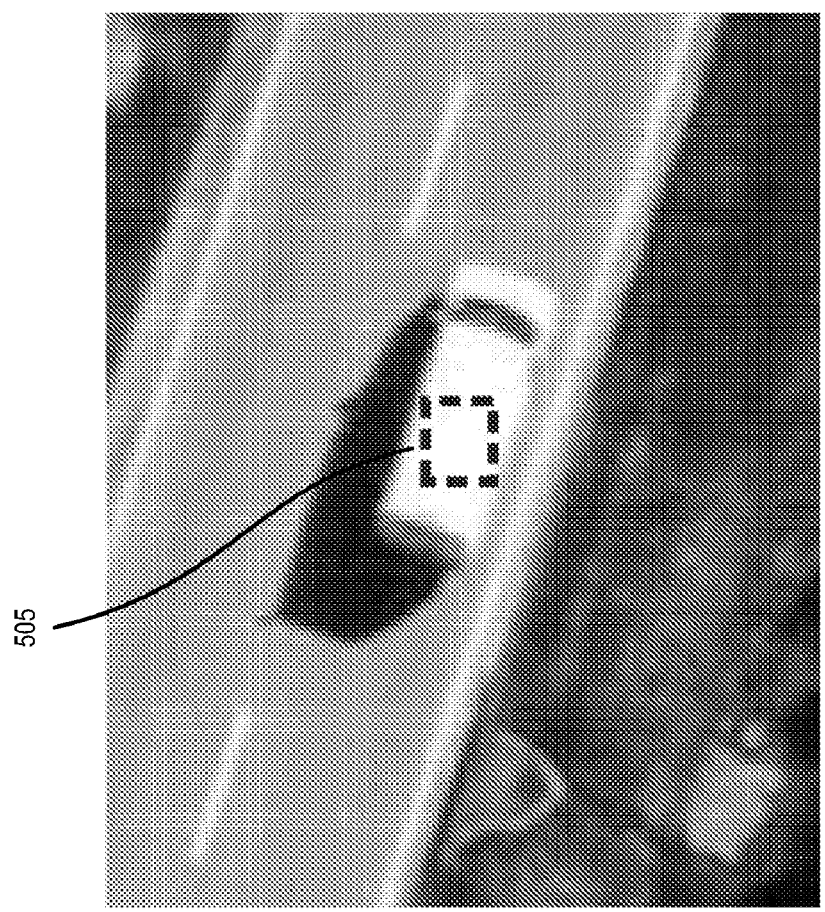

The seed area definition step 404 consists of selecting a seed area. For example, the seed area may be selected by a user via an input device. The selection is then received by the system. The user can select a single pixel, by pressing and releasing a mouse button when a mouse cursor is positioned on the object that the user wishes to select. The user can also select an area of pixels by pressing the mouse button, dragging the mouse to select a rectangular area on the desired object, then releasing the mouse button. FIG. 5A shows an exemplary pressing of the mouse button 502. FIG. 5B shows an exemplary dragging operation 504. FIG. 5C shows the resulting selected seed area 506 after releasing the mouse button.

Once the seed area is defined in step 404, the user can start defining the area to be selected for image manipulation in step 406. Step 406 is described in further detail below with respect to FIG. 6. The definition of the selected area can be done interactively with the input device, and the user can change the size of the selected area interactively without having to change any tolerance parameter.

The selected area is a contiguous set of pixels that have been selected through user input. The starting size of the selected area is the seed area. After the seed area is selected, and before the user starts controlling the size of the selected area, the selected area is initialized with the pixels contained in the seed area. The seed area is also the smallest possible size of the selected area. The largest possible size of the selected area is the size of the image itself.

In an exemplary embodiment of the present invention, the control of the size of the selected area is achieved by moving the mouse cursor on the screen. By moving the mouse cursor away from the seed area, the selected area increases in size and includes pixels having colors increasingly different from the seed area colors. By moving the mouse cursor back toward the seed area, the selected area can be decreased in size, excluding pixels that were previously included. This way, the user can easily move back and decrease the size of the selected area if it has become larger than the size of the object he wants to select.

The user can also control the size of the selected area with a mouse wheel: by scrolling the wheel in one direction, the selected area increases in size, when the wheel is scrolled in the opposite direction, the selected area decreases in size, or by other methods.

The control of the selected area can become active as soon as the user has defined the seed area. From that moment, as the user moves the mouse, without pressing any mouse buttons, the selected area becomes larger or smaller, depending on the direction the user is moving the input device.

A selected area has a contour: a set of pixels that mark the edge between the pixels that are located inside the selected area and those that are not. The pixels that form the contour of the selected area are not part of the selected area.

Each time the user moves the input device to modify the size of the selected area, a polygon representing the contour of the selected area on the screen is refreshed: the old contour polygon of the selected area is erased, and a new contour polygon is displayed. This lets the user know in real time how large the selected area is, and enables him to react by further moving the input device if the size of the selected area is not appropriate.

Every time the user performs an action to change the size of the selected area (e.g. moving the mouse, scrolling the mouse wheel, etc.), an exemplary embodiment of the present invention first checks whether the user wants to increase or decrease the size of the selected area, for example, by verifying the direction of the wheel scrolling or by comparing the distance between the mouse pointer and the location of the seed area with the previously calculated distance.

Figure 6:
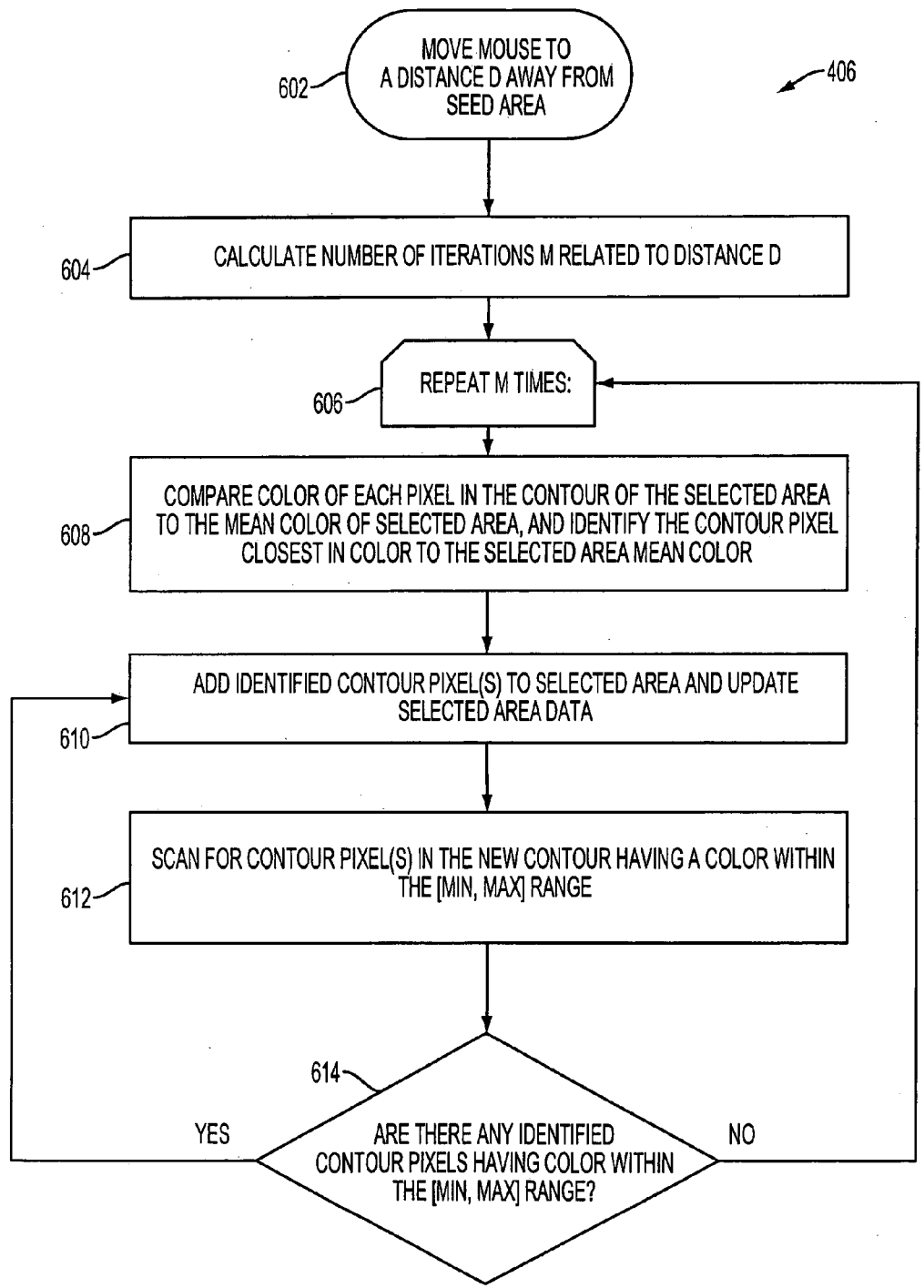
FIG. 6 depicts a flow chart of an exemplary embodiment of the step of selected area control according to the present invention.

For example, FIG. 6 illustrates a process that may be performed when the user wants to increase the size of the selected area. To increase the size of the selected area, the user moves the mouse cursor away from the seed area, increasing its distance from the seed to a distance d in step 602. In step 604, a parameter m is calculated to determine the number of times the following steps should be iterated. The parameter m is the number of times the addition of new pixels should be done each time the user performs an action to increase the size of the selected area. The parameter m is proportional to the increase in distance between the seed and the mouse cursor, or to the movement of the mouse wheel. Therefore, the farther away from the seed area the user moves the mouse (or scrolls its wheel), the quicker the selected area enlarges. This proportionality provides a good feedback to the user. In an exemplary embodiment of the present invention, in the case where the method uses the displacement of the mouse pointer as a basis to calculate region enlargement, $m=k(d_1-d_0)$, where $d_1$ is the distance between the mouse cursor and the seed area, $d_0$ is the distance between the previous position of the mouse pointer and the seed area, and k is a positive user-selectable constant.

In an exemplary embodiment, each time a pixel is read from the image, it is converted from the color system in which it is stored (usually RGB) to a CIELAB color value $(l_i, a_i, b_i)$. Every time the size of the selected area changes, the values holding the sum, the minimum and the maximum values of the l, a and b parameters of all pixels in the selected area are updated, using the following equations:

$$Sum_{lS} = \sum_{i=0}^{n_S} l_i; \; Sum_{aS} = \sum_{i=0}^{n_S} a_i; \; \text{and} \; Sum_{bS} = \sum_{i=0}^{n_S} b_i, \quad (1)$$

$$Min_{lS}=MIN_{i=0}^{n_S} l_i; \; Max_{lS}=MAX_{i=0}^{n_S} l_i \quad (2)$$

$$Min_{aS}=MIN_{i=0}^{n_S} a_i; \; Max_{aS}=MAX_{i=0}^{n_S} a_i \quad (3)$$

$$Min_{bS}=MIN_{i=0}^{n_S} b_i; \; Max_{bS}=MAX_{i=0}^{n_S} b_i \quad (4)$$

where $n_S$ is the number of pixels in the selected area.

Starting at iteration point 606, the method of selected area enlargement repeats m times. All of the pixels that form the contour of the selected area are scanned, and the one pixel having a color closest to the mean color of all pixels inside the selected area is identified in step 608. The mean color of the selected area is defined as:

$$(l_m, a_m, b_m) = \left( \frac{Sum_{lS}}{n_S}, \frac{Sum_{aS}}{n_S}, \frac{Sum_{bS}}{n_S} \right)$$

The difference between the mean color of the selected area and a color i is obtained using weighted version of the Euclidean distance equation:

$$Diff(i,m)=\sqrt{k_l(l_m-l_i)^2+k_{ab}(a_m-a_i)^2+k_{ab}(b_m-b_i)^2} \quad (5)$$

where $k_l$ and $k_{ab}$ are parameters that weigh the relative importance between the intensity channel (l) and the color channels (a and b). They can each take values between 0 and 1, and can be selectable by the user. Manipulating these parameters is useful, for example, when the light intensity values change inside an object to be selected, such as when part of the object is in shadow. In such cases, a better selection can be achieved if the weight of the light intensity is decreased in the equation that calculates color difference, i.e. if the user sets the $k_l$ value to a value smaller than $k_{ab}$.

The found pixel is then added to the selected area in step 610 and the selected area data is updated, as will be described with respect to FIG. 7 below. Then, all of the pixels that form the new contour of the updated selected area are scanned in step 612 to identify those contour pixels having a color that falls within the [Min, Max] color range found with equations 2–4. If there are such pixels in step 614, then the process repeats from step 610 until there are no contour pixels having a color inside the [Min, Max] range. If there are no contour pixels having a color in the [Min, Max] range, then the entire process repeats from 606, until m iterations are performed.

Figure 7:
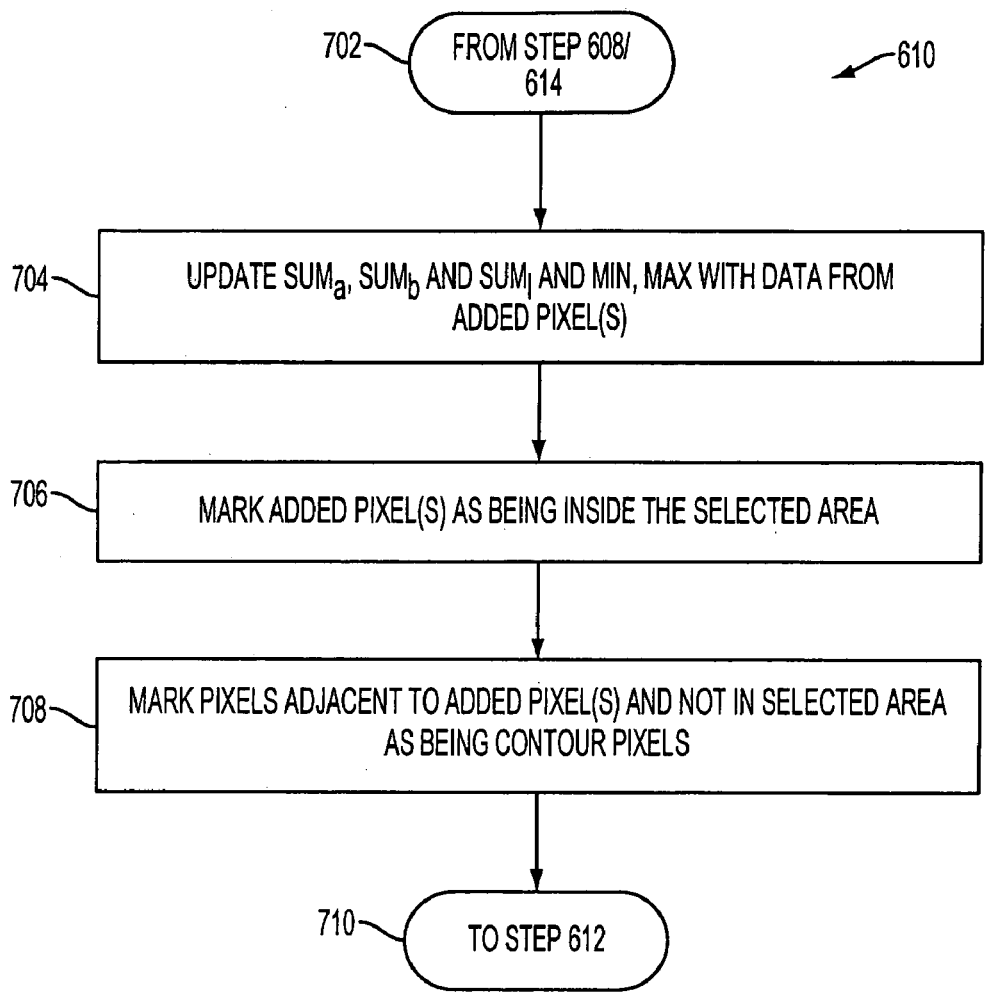
FIG. 7 depicts a flow chart of an exemplary embodiment of the step of adding pixels to the selected area according to the present invention.

The addition of a pixel to the selected area method of step 610 is depicted in FIG. 7. Once a pixel is found (in step 608 or 614) in step 702, the sums ($Sum_{lS}$, $Sum_{aS}$, $Sum_{bS}$) and the Min and Max values ($Min_{lS}$, $Max_{lS}$, $Min_{aS}$, $Max_{aS}$, $Min_{bS}$, $Max_{bS}$) for the selected area, along with the number of pixels $n_S$, are updated in 704 to take account of the new pixel or pixels. The found pixel(s) are marked as being inside the selected area in 706. Then, the pixels adjacent to the found pixels that are not already in the selected area are marked as contour pixels in step 708. At step 710, the new contour is then scanned, returning to step 612.

Figure 8B:
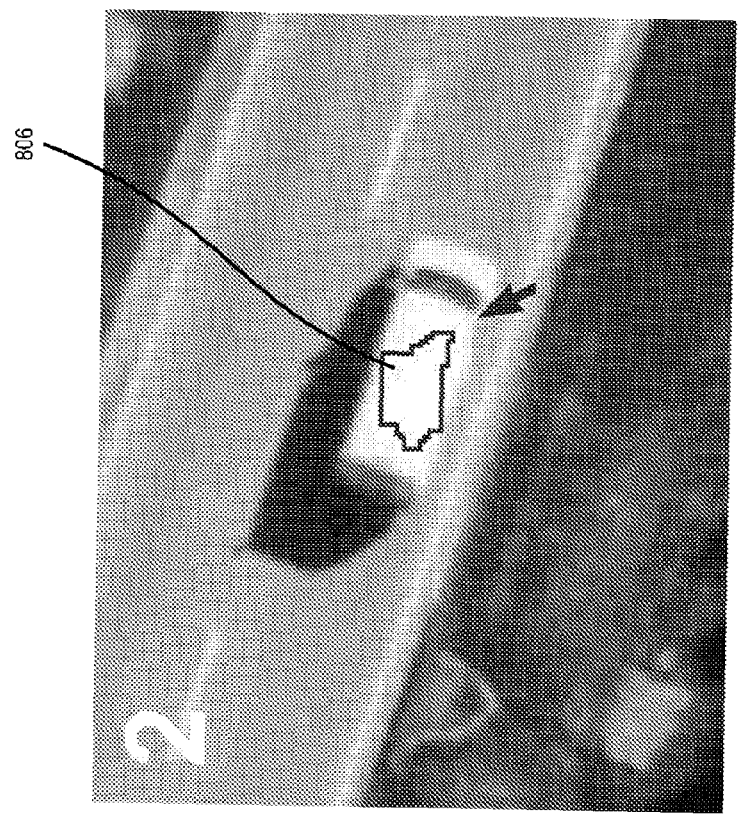
FIGS. 8A–F depict an exemplary embodiment of enlarging a selected area according to the present invention.
Figure 8A:
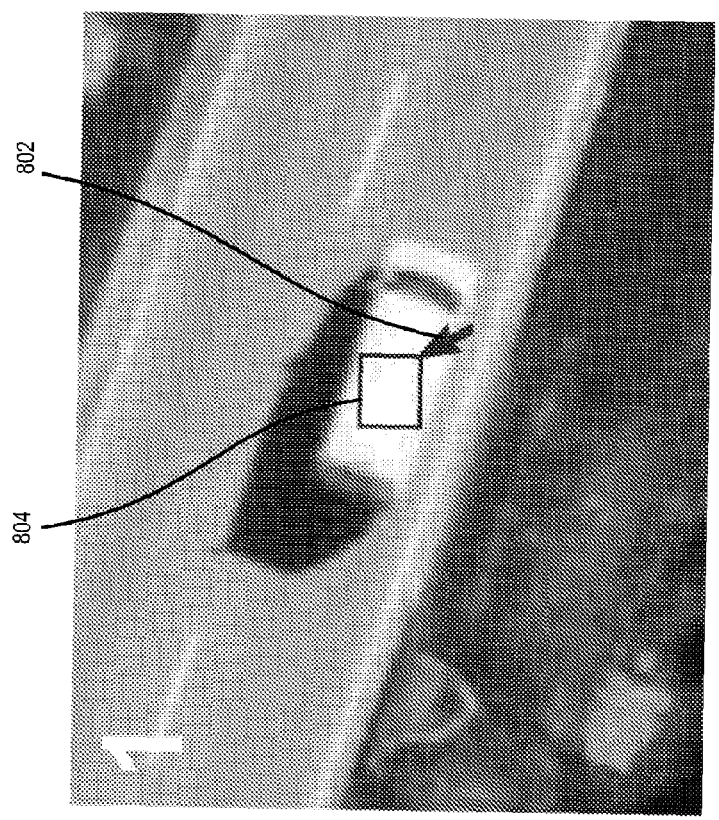
Figure 8D:
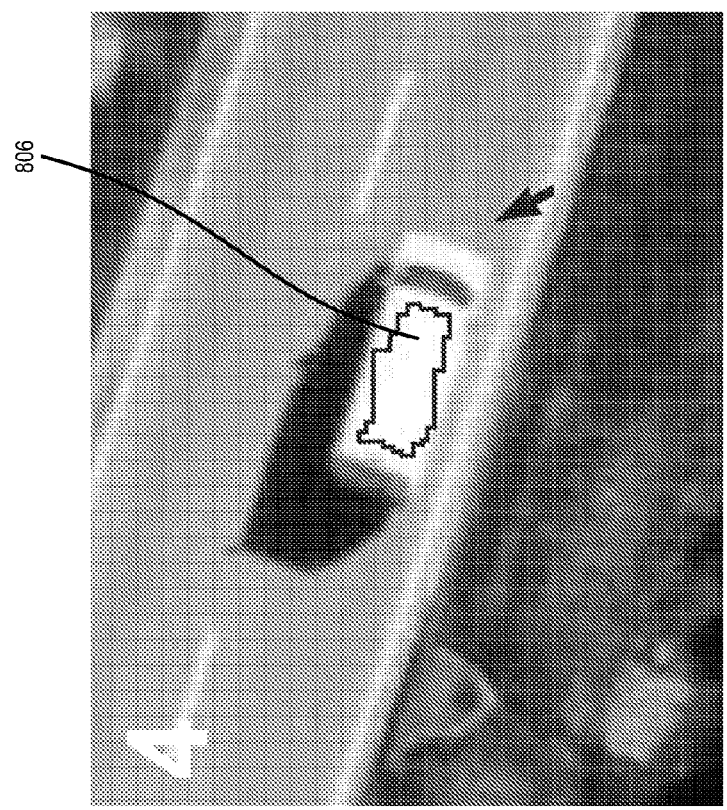
Figure 8C:
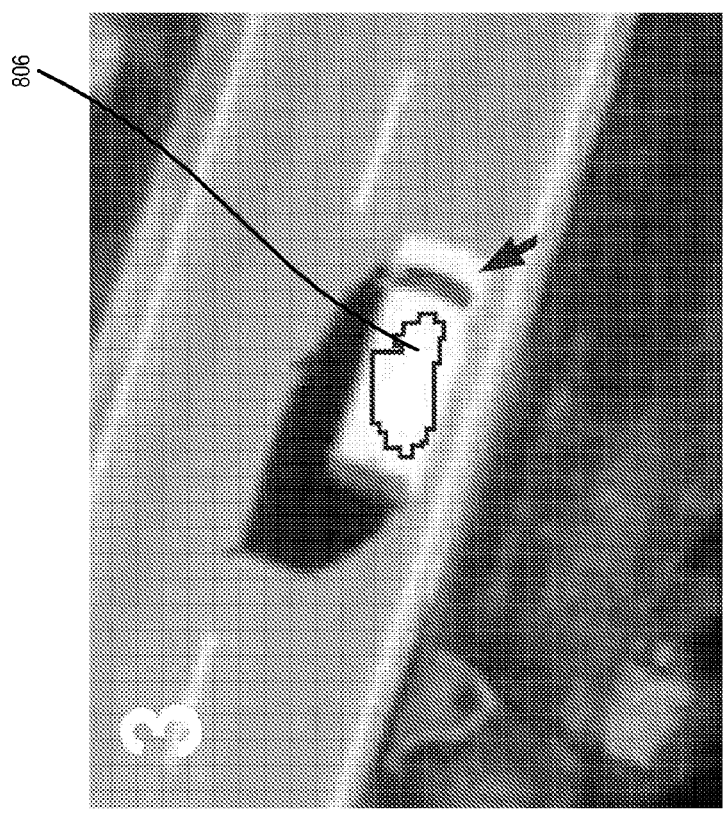
Figure 8F:
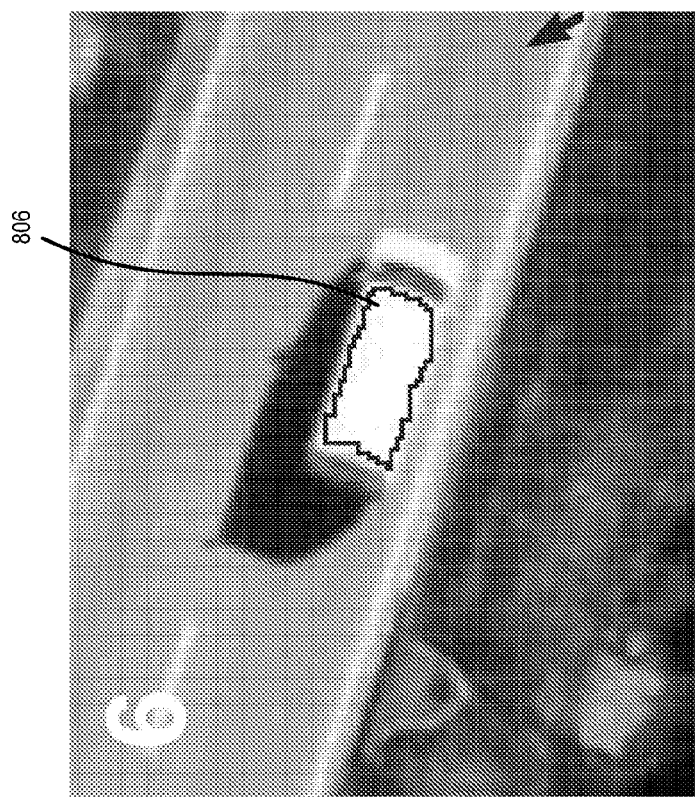
Figure 8E:
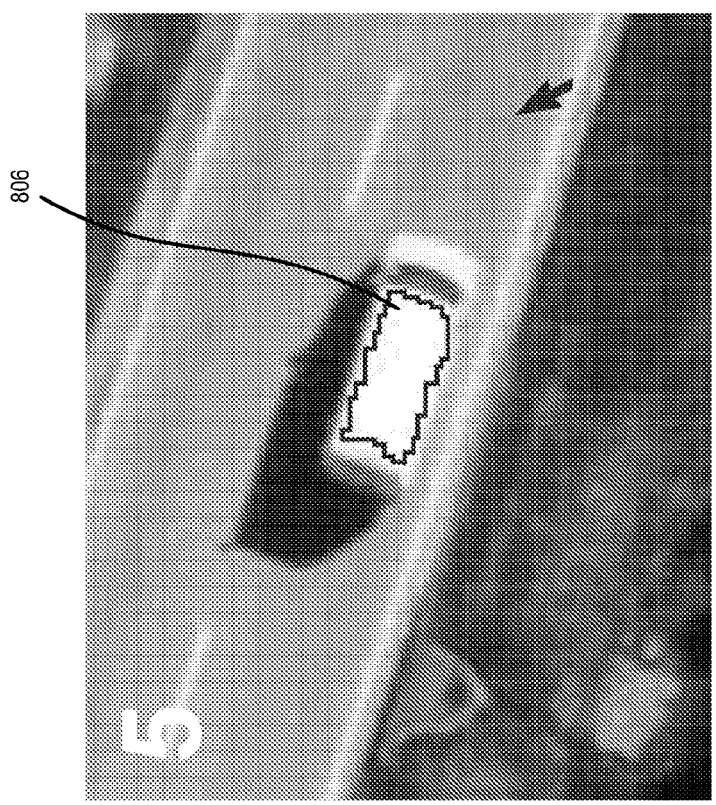

FIGS. 8A–8E show the process of enlarging a selected area. In FIG. 8A, a seed area 804 is selected. In FIGS. 8B–8F, the mouse cursor 802 is gradually moved farther away from the center position of the seed area 804. As the mouse cursor 802 moves further away from the original seed area 804, the selected area 806 gets larger.

If the user requests a decrease of the size of the selected area (for example, by moving the mouse toward the seed area, or by scrolling the mouse wheel backward), then the actions taken to enlarge the selected area are reversed. For example, over m iterations, all the pixels that were most recently added to the selected area are removed from it. Then all of the removed pixels are marked as outside pixels or contour pixels, depending on their proximity to the revised selected area. The values of the sums ($Sum_{lS}$, $Sum_{aS}$, $Sum_{bS}$) and of the Min and Max values ($Min_{lS}$, $Max_{lS}$, $Min_{aS}$, $Max_{aS}$, $Min_{bS}$, $Max_{bS}$) are changed back to their values before the removed pixels were added to the selected area.

Figure 9B:
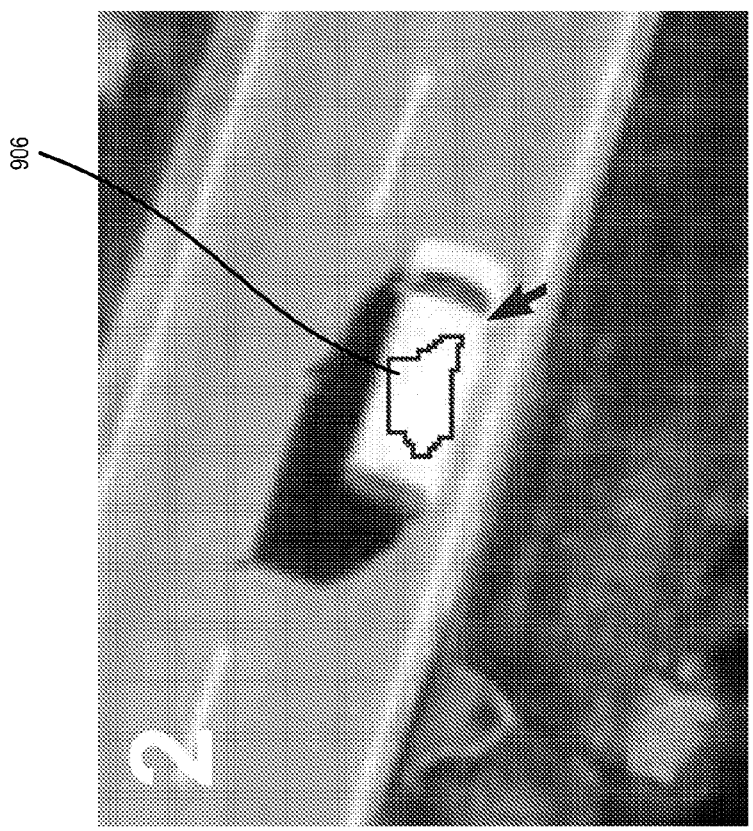
FIGS. 9A–F depict an exemplary embodiment of shrinking a selected area according to the present invention.
Figure 9A:
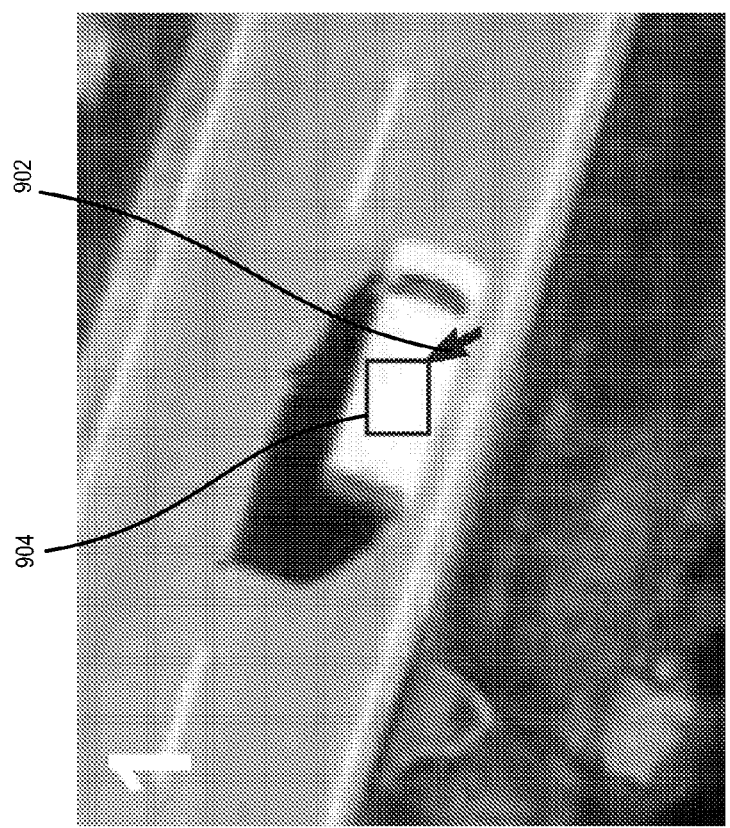
Figure 9D:
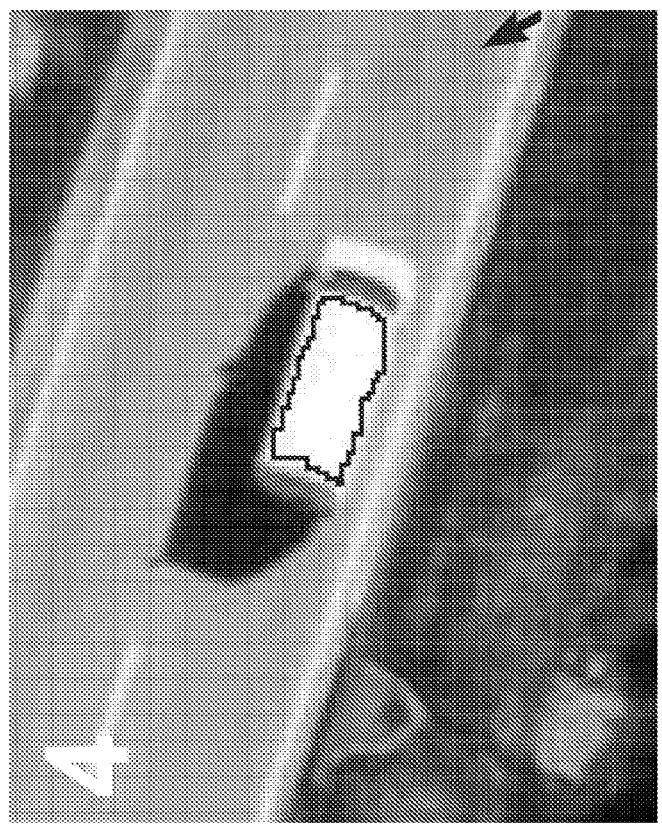
Figure 9C:
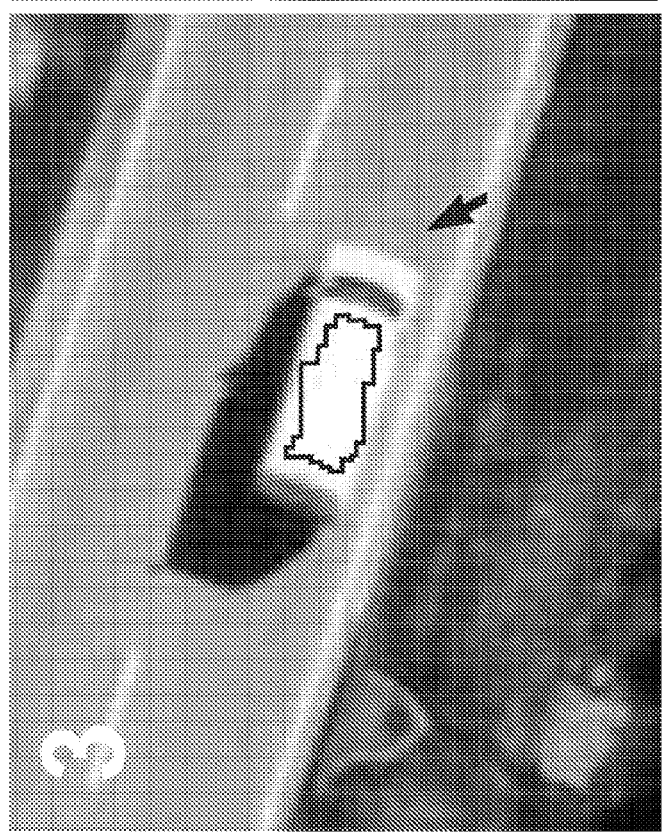
Figure 9F:
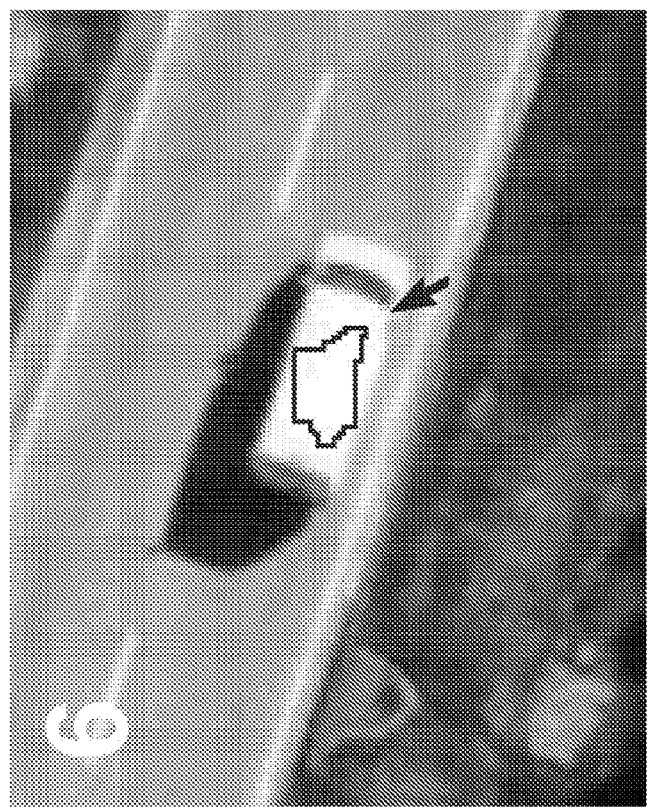
Figure 9E:
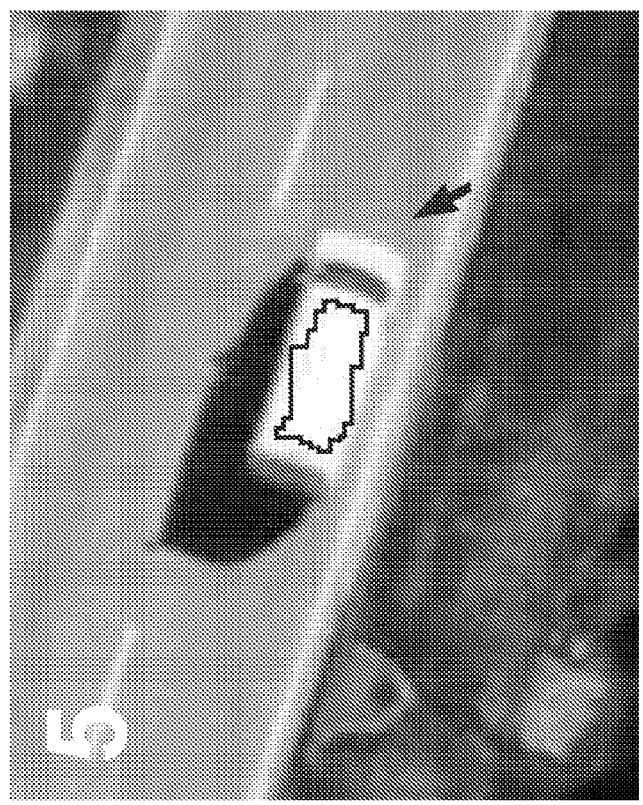

FIGS. 9A–9F show the process of enlarging and then shrinking a selected area. In FIG. 9A, a seed area 904 is selected. In FIGS. 9B–9D, the mouse cursor 902 is gradually moved farther away from the center position of the seed area 904. As the mouse cursor 902 moves further away from the original seed area 904, the selected area 906 gets larger. In FIG. 9E, the mouse cursor 902 is moved closer to the seed area 904, causing the selected area 906 to shrink. In FIG. 9F, the selected area 906 has shrunk still further as the mouse cursor 902 is brought closer to the seed area 904.

A smoothing operation is optionally provided. The smoothing operation can minimize image noise that can lead to unstable size and shape of selected area. When active, the smoothing oepration smoothes the pixels of the image, increasing the uniformity of the colors of neighboring pixels, thereby improving the quality of the selection. Smoothing processes are well known to those of ordinary skill in the art. In an exemplary embodiment, the smoothing operation includes replacing the color of each pixel of the image with the average color of that pixel and of its eight neighbors. That process can be done once at the beginning of the process for the whole image, or each time a pixel is read from the image for processing in the method described above.

When the process is complete and the user has stopped moving the input device, the user can accept or reject the selected area. In an exemplary embodiment of the present invention, the user can click using the left mouse button to accept the selection, or click the right mouse button to cancel the selection.

Once the user has accepted the selection, then one of two different things can happen, depending on user settings. First, the selected area can become the active selection. The active selection is, in this case, an area of pixels contiguous to the seed area that contains exactly the same pixels as the selected area. Alternatively, all pixels of the image having a color that falls within the interval: [$Min_l$,$Max_l$], [$Min_a$, $Max_a$], [$Min_b$, $Max_b$] could become part of the active selection. This way, the active selection can potentially be made of several non-contiguous areas having pixels that fall within the color interval given above.

If the user accepts the selection, then the selected area becomes the active selection. If the user rejects and cancels the selection, the selected area is destroyed. In either case, all the values used in the process are then reset.

While various embodiments of the present invention have been described above, it should be understood that they have been presented by way of example only, and not limitation. Thus, the breadth and scope of the present invention should not be limited by any of the above-described exemplary embodiments, but should instead be defined only in accordance with the following claims and their equivalents.

What is claimed is:

1. A computer-implemented method of selecting an object in a raster image, the method comprising the steps of:
   (a) selecting a seed region in a raster image with an input device, wherein said raster image comprises at least one object and a plurality of pixels, each pixel having a color, and wherein said seed region comprises at least one pixel in said object;
   (b) moving a cursor corresponding to said input device to a distance d from said seed region in said raster image;
   (c) generating a selected region from said seed region, wherein said selected region comprises at least all pixels in said seed region, said selected region is enclosed by a contour, and wherein the size of said selected region is based on said distance d and on a comparison of a color of a pixel outside said selected region and a range of color of pixels in said selected region;
   (d) choosing said selected region when said selected region is satisfactory to a user; and
   (e) indicating said selected region on a display.

2. The method of claim 1, wherein said pixel color is a three parameter color.

3. The method of claim 1, wherein said step (c) further comprises:
   for each pixel in said selected seed region, computing a separate minimum and maximum color value for each color parameter value.

4. The method of claim 3, wherein prior to computing said separate minimum and maximum color values, said pixel color is converted to CIELAB color parameters.

5. The method of claim 1, wherein said step (c) further comprises:
(1) calculating a number m of iterations based on said distance d; and
(2) repeating m times:
(i) identifying a pixel in said contour of said selected region having a color closest to an average color of said selected region;
(ii) adding said identified pixel to said selected region;
(iii) updating information about said selected region and said contour with information about said added pixel;
(iv) identifying at least one pixel in said updated contour having a color within a minimum and maximum color range of said selected region; and
(v) adding said identified at least one pixel to said selected region when said color values are within said minimum and maximum color values.

6. The method of claim 5, wherein said step (c)(2)(iii) comprises:
updating a minimum and a maximum color value and a number of pixels for said selected region;
marking said identified at least one pixel as being inside said selected region; and
marking pixels adjacent to said identified at least one pixel as being contour pixels when said adjacent pixels are not already in said selected region.

7. The method of claim 5, wherein said step (c)(2)(v) comprises:
updating a minimum and a maximum color value for said selected region;
marking said identified pixel as being inside said selected region; and
marking pixels adjacent to said identified pixel as being contour pixels when said adjacent pixels are not already in said selected region.

8. The method of claim 1, wherein said step (c) further comprises:
(1) moving said input device towards said seed region to a distance d1 from said seed region;
(2) calculating a number m1 of iterations based on said distance d1; and
(3) repeating m1 times:
(i) removing a most recently added pixel from said selected region;
(ii) marking said removed pixel as being a contour pixel; and
(iii) marking pixels adjacent to said removed pixel as being at least one of outside the selected region and a contour pixel.

9. The method of claim 1, wherein said distance d is determined by at least one of an amount and a direction of scrolling of a mouse scroll wheel, and a movement and direction of a mouse cursor.

10. The method of claim 5, wherein said pixel having a color closest to said average color is determined by calculating a weighted Euclidean distance between said average color and said pixel color.

11. The method of claim 10, wherein said Euclidean distance is weighted with an intensity weight and a color weight, each weight being a positive value between zero and one and selectable by the user.

12. The method of claim 1, wherein prior to step (a), said raster image is smoothed.

13. The method of claim 1, further comprising:
choosing between a contiguous selected area and a selected area that contains non-contiguous regions of all image areas containing pixels within said selected area's range of minimum and maximum color values.

14. The method of claim 1, further comprising receiving user input varying said distance d.

15. The method of claim 14, further comprising varying the size of said selected region based on said changed distance d.

16. A system for selecting an object in a raster image, the system comprising:
(a) means for selecting a seed region in a raster image with an input device, wherein said raster image comprises at least one object and a plurality of pixels, each pixel having a color, and wherein said seed region comprises at least one pixel in said object;
(b) means for determining a distance d from an input device cursor to said seed region;
(c) means for generating a selected region from said seed region, wherein said selected region comprises at least all pixels in said seed region, said selected region is enclosed by a contour, and wherein the size of said selected region is based on said distance d and on a comparison of a color of a pixel outside said selected region and a range of color of pixels in said selected region;
(d) means for choosing said selected region when said selected region is satisfactory to a user; and
(e) means for displaying said selected region.

17. The system of claim 16, wherein said pixel color is a three parameter color.

18. The system of claim 16, wherein said element (c) further comprises:
means for computing a separate minimum and maximum color value for each pixel in said selected seed region for each color parameter value.

19. The system of claim 18, further comprising means for converting said pixel color to CIELAB color parameters.

20. The system of claim 16, wherein said element (c) further comprises:
(1) means for calculating a number m of iterations based on said distance d;
(2) means for identifying a pixel in said contour of said selected region having a color closest to an average color of said selected region;
(3) means for adding said identified pixel to said selected region; and
(4) means for updating information about said selected region and said contour with information about said added pixel.

21. The system of claim 20, wherein said element (c)(2) further comprises:
means for updating a minimum and a maximum color value and a number of pixels for said selected region;
means for marking said identified at least one pixel as being inside said selected region; and
means for marking pixels adjacent to said identified at least one pixel as being contour pixels when said adjacent pixels are not already in said selected region.

22. The system of claim 16, wherein said element (c) further comprises:
(1) means for moving said input device towards said seed region to a distance d1 from said seed region;
(2) means for calculating a number m1 of iterations based on said distance d1;
(3) means for removing a most recently added pixel from said selected region;
(4) means for marking said removed pixel as being a contour pixel; and
(5) means for marking pixels adjacent to said removed pixel as being at least one of outside the selected region and a contour pixel.

23. The system of claim 16, wherein said distance d is determined by at least one of an amount and a direction of scrolling of a mouse scroll wheel, and a movement and direction of a mouse cursor.

24. The system of claim 20, wherein said pixel having a color closest to said average color is determined by calculating a weighted Euclidean distance between said average color and said pixel color.

25. The system of claim 24, wherein said Euclidean distance is weighted with an intensity weight and a color weight, each weight being a positive value between zero and one and selectable by the user.

26. The system of claim 16, further comprising means for smoothing said raster image.

27. The system of claim 16, further comprising:
means for choosing between a contiguous selected area and a selected area that contains non-contiguous regions of all image areas containing pixels within said selected area's range of minimum and maximum color values.

28. A computer useable information storage medium storing computer readable program code for causing a computer to perform the steps of:
(a) receiving a selection of a seed region in a raster image, wherein said raster image comprises at least one object and a plurality of pixels, each pixel having a color, and wherein said seed region comprises at least one pixel in said object;
(b) determining a distance d from an input device cursor to said seed region;
(c) generating a selected region from said seed region, wherein said selected region comprises at least all pixels in said seed region, said selected region is enclosed by a contour, and wherein the size of said selected region is based on said distance d and on a comparison of a color of a pixel outside said selected region and a range of color of pixels in said selected region;
(d) choosing said selected region when said selected region is satisfactory to a user; and
(e) indicating said selected region on a display.

29. The computer useable information storage medium storing computer readable program code of claim 28, wherein said pixel color is a three parameter color.

30. The computer useable information storage medium storing computer readable program code of claim 28, wherein said step (c) further comprises:
for each pixel in said selected seed region, computing a separate minimum and maximum color value for each color parameter value.

31. The computer useable information storage medium storing computer readable program code of claim 30, wherein prior to computing said separate minimum and maximum color values, said pixel color is converted to CIELAB color parameters.

32. The computer useable information storage medium storing computer readable program code of claim 28, wherein said step (c) further comprises:
(1) calculating a number m of iterations based on said distance d; and
(2) repeating m times:
(i) identifying a pixel in said contour of said selected region having a color closest to an average color of said selected region;
(ii) adding said identified pixel to said selected region;
(iii) updating information about said selected region and said contour with information about said added pixel;
(iv) identifying at least one pixel in said updated contour having a color within a minimum and maximum color range of said selected region; and
(v) adding said identified at least one pixel to said selected region when said color values are within said minimum and maximum color values.

33. The computer useable information storage medium storing computer readable program code of claim 32, wherein said step (c)(2)(iii) comprises:
updating a minimum and a maximum color value and a number of pixels for said selected region;
marking said identified at least one pixel as being inside said selected region; and
marking pixels adjacent to said identified at least one pixel as being contour pixels when said adjacent pixels are not already in said selected region.

34. The computer useable information storage medium storing computer readable program code of claim 32, wherein said step (c)(2)(v) comprises:
updating a minimum and a maximum color value for said selected region;
marking said identified pixel as being inside said selected region; and
marking pixels adjacent to said identified pixel as being contour pixels when said adjacent pixels are not already in said selected region.

35. The computer useable information storage medium storing computer readable program code of claim 28, wherein said step (c) further comprises:
(1) moving said input device towards said seed region to a distance d1 from said seed region;
(2) calculating a number m1 of iterations based on said distance d1; and
(3) repeating m1 times:
(iv) removing a most recently added pixel from said selected region;
(v) marking said removed pixel as being a contour pixel; and
(vi) marking pixels adjacent to said removed pixel as being at least one of outside the selected region and a contour pixel.

36. The computer useable information storage medium storing computer readable program code of claim 28, wherein said distance d is determined by at least one of an amount and a direction of scrolling of a mouse scroll wheel, and a movement and direction of a mouse cursor.

37. The computer useable information storage medium storing computer readable program code of claim 32, wherein said pixel having a color closest to said average color is determined by calculating a weighted Euclidean distance between said average color and said pixel color.

38. The computer useable information storage medium storing computer readable program code of claim 37, wherein said Euclidean distance is weighted with an intensity weight and a color weight, each weight being a positive value between zero and one and selectable by the user.

39. The computer useable information storage medium storing computer readable program code of claim 28, wherein prior to step (a), said raster image is smoothed.

40. The computer useable information storage medium storing computer readable program code of claim 28, further comprising:
choosing between a contiguous selected area and a selected area that contains non-contiguous regions of all image areas containing pixels within said selected area's range of minimum and maximum color values.

* * * * *